United States Patent [19]

Maurus: Leonhard

[11] Patent Number: 4,466,186
[45] Date of Patent: Aug. 21, 1984

[54] CHISELING OR TRIMMING MACHINE

[76] Inventor: Leonhard Maurus, Blattergasse 9⅓, D - 8940 Memmingen, Fed. Rep. of Germany

[21] Appl. No.: 253,498

[22] Filed: Apr. 13, 1981

[30] Foreign Application Priority Data

Apr. 12, 1980 [DE] Fed. Rep. of Germany ....... 3014139

[51] Int. Cl.³ .............................................. B29C 17/12
[52] U.S. Cl. ........................................ 30/124; 83/914
[58] Field of Search .......................... 83/914, 525, 614; 30/168, 124, 123

[56] References Cited

U.S. PATENT DOCUMENTS 3,703,114  11/1972  Topopolsky ........................ 83/914
3,810,405   5/1974  Oberloier ........................... 83/914

Primary Examiner—Jimmy C. Peters
Attorney, Agent, or Firm—Edwin E. Greigg

[57] ABSTRACT

The chiseling or trimming machine serves primarily to deburr welding seams from frames welded together of profiled plastic parts, such as are used for facades, doors and windows. The machine has a bearing surface on which the workpiece to be machined is placed against a stop angle and held firmly by means of holder cylinders. Furthermore the machine has a workpiece carrier displaceable with a transport device, and the tool holder supporting the chiseling or trimming die is supported on the tool carrier such that it yields in the upward direction in response to pressure. The bench machine is embodied as a hand-operated machine such that the bearing surfaces as well as at least one handle are disposed on an upper crosspiece of the tool carrier with its transport device, and that this crosspiece is connected by means of two rods with a lower crosspiece disposed parallel to the upper bearing surface.

10 Claims, 6 Drawing Figures

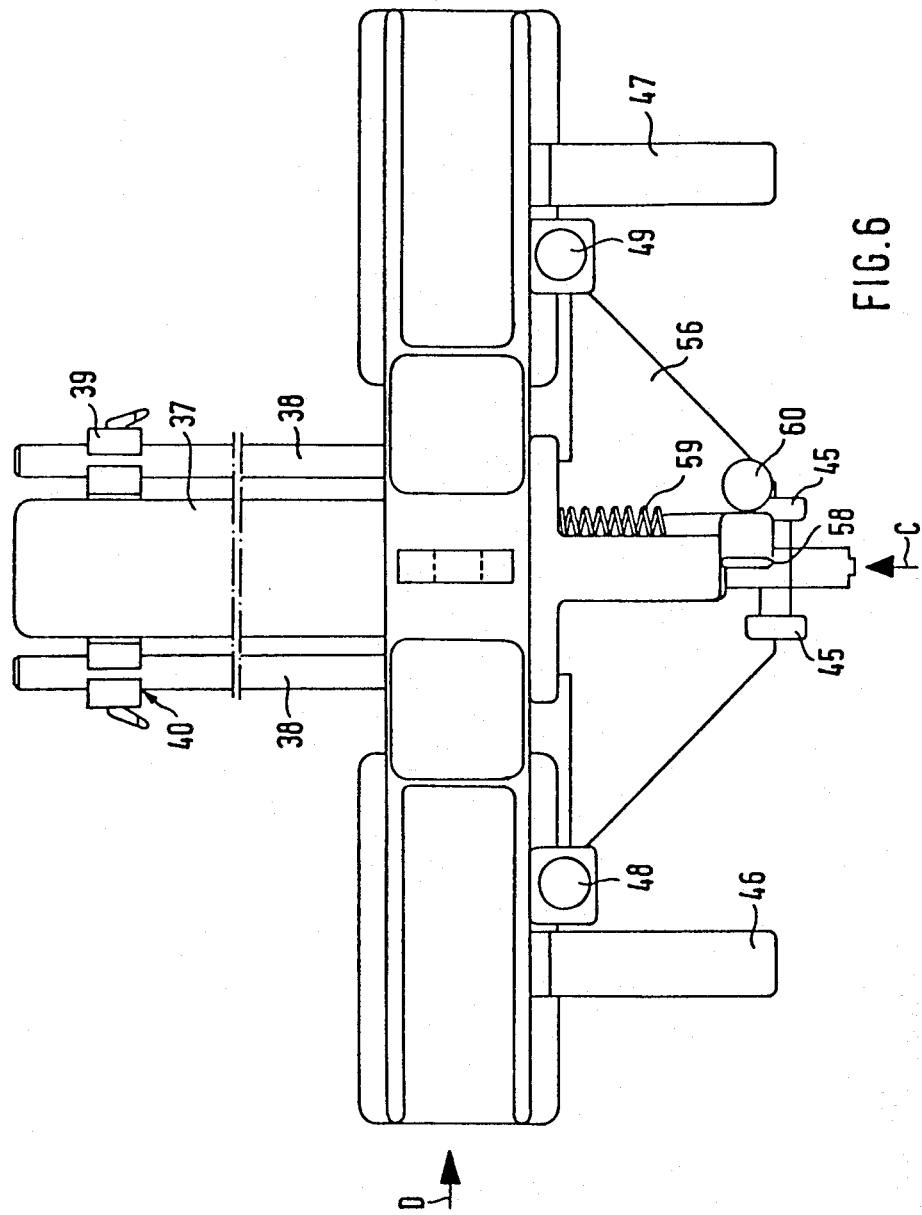

CHISELING OR TRIMMING MACHINE

The invention relates to a chiseling or trimming machine, intended in particular for deburring welding seams in welded, polygonal frames, especially those made of shaped plastic parts. The chiseling or trimming machine has a support surface, on which the element to be trimmed is placed against an arresting bracket and held immovably by means of two holder cylinders, and a tool carrier which can be displaced in the working plane by an electric, hydraulic or pneumatic transport device. The tool holder carrying the chisel or trimmer is secured on the tool carrier in a manner such that under pressure it yields in the upward direction.

In the course of welding structural parts such as door and window frames or wall lattices, ridges and burrs are formed on the outer surfaces. Not only do such protrusions disfigure the appearance of these frames; they also make cleaning more difficult. Accordingly, they must be removed. This was previously accomplished by grinding or milling, which necessitated a substantial expenditure of time.

Up to 80% of this expended time can be saved by using chiseling or trimming machines of the type developed recently. These machines comprise a stand having a work-surface plate representing the support surface for the frames which are to be trimmed. After the frames have been placed thereon, this plate is pressed against a stop which engages its outer edges. With the aid of two hydraulic or pneumatic holder cylinders which move vertically downward, the frame is fixed immovably in position on the work-surface plate or support surface. The tool carrier, which along with its transport device is attached to a vertical support frame in such a way that it can be adjusted in height, is now adjusted and fixed in position at the level at which the work will be performed (that is, in accordance with the height of the shaped piece which is to be trimmed).

In comparison with their utility, these machines require a substantial expenditure in terms of material and manufacturing costs and are therefore expensive. A further disadvantage is that when material having a different height is to be trimmed, that is, when the work is to be performed at a different height, time must be allowed for preparing for this changeover. The fact that the frame is arrested at its outer rim results in a further disadvantage: the V-shaped welding seams of rods meeting at right angles (for instance, in abutment joints at the springing of an arch) cannot be trimmed using this machine. These seams must still be ground or milled by hand, as before. Furthermore, the known machine has no stroke-limiting means.

OBJECT AND SUMMARY OF THE INVENTION

The object of the present invention is to create a chiseling or trimming machine which is easy to manipulate and involves a low expenditure in terms of material and manufacturing costs, and in which the deficiencies and disadvantages of the known, stationary machine have been eliminated. Furthermore, the utility of such a machine is doubled because both welding seams, on the outside and inside of one frame joint, can be trimmed in a single operation.

The chiseling and trimming machine according to the present invention is embodied such that it can be manipulated. This is effected by attaching the tool carrier, together with its transport device, the support surface and at least one handle, to an upper crosspiece; this upper crosspiece is connected by two rods with a lower crosspiece, which is disposed parallel to the upper support surface.

Since the machine according to the invention, being a hand tool, is embodied as substantially smaller than the previously known stand-mounted machine, there are significant savings in both material and production costs, so that the total cost of manufacture is at least 60less than in the case of the previously known machine. Furthermore, using this tool has also been made substantially easier in biotechnological terms, because the frames being worked on (lattice frames for walls, for instance), which are frequently quite bulky, do not need to be pivoted or turned around. Instead, the operator can take the hand machine, which may also be suspended from an overhead conveyor track, along with him as he walks or drives from one weld location to another to remove the weld ridges. Because the frame is arrested from the inside rather than the outside, even the welding seams of shaped rods meeting at right angles (arch abutments, transoms and the like) can be trimmed in the same manner. Since the frame to be trimmed is pressed from the bottom upward as it is fastened in place, the machine adjusts itself automatically to the various heights of the shaped elements being trimmed.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 6 shows a top plan view of the machine of FIGS. 4 and 5 in outline.

DESCRIPTION OF THE PREFERRED EMBODIMENTS

Figure 1:
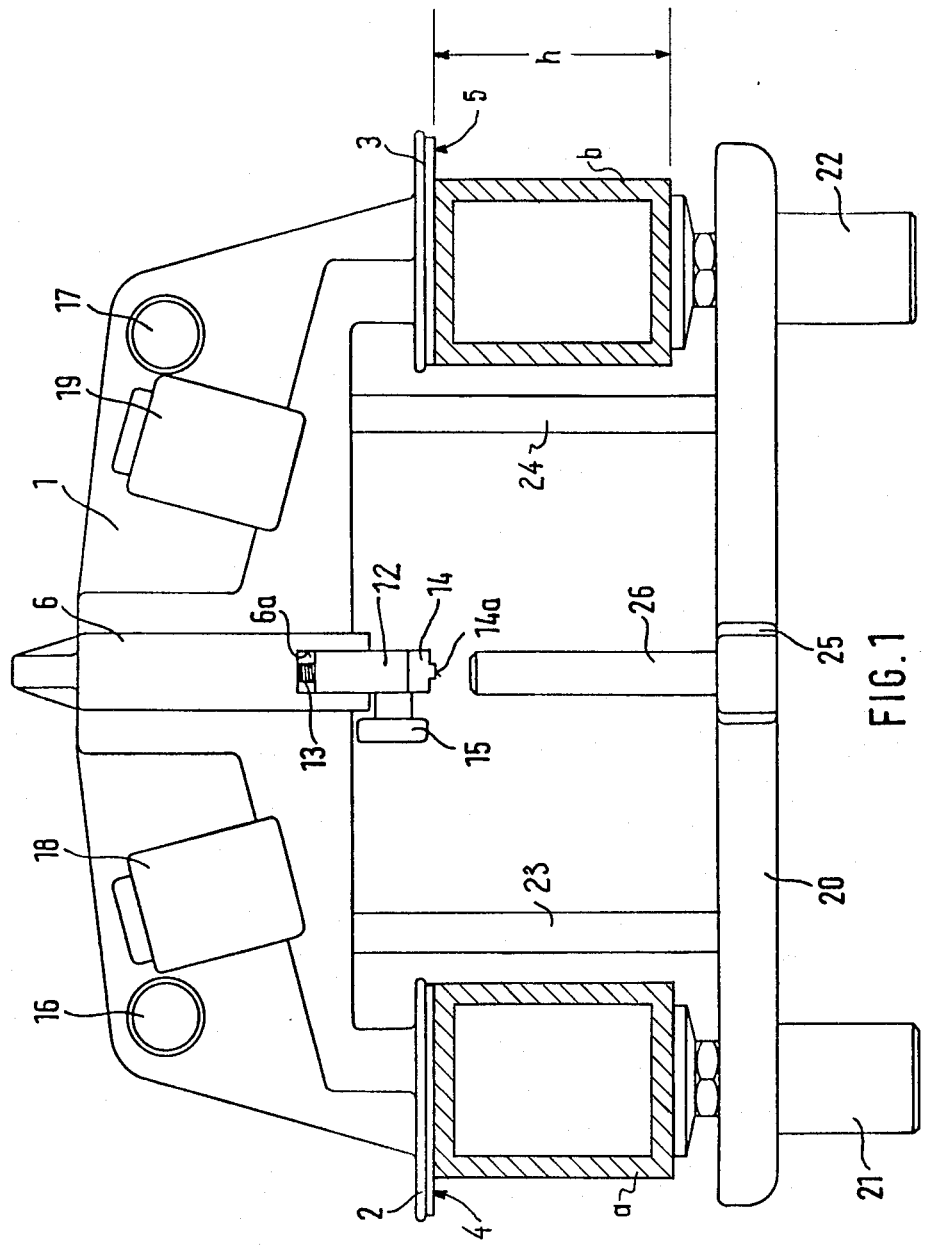
FIG. 1 is a front elevational view showing a chiseling and trimming machine having one tool carrier (the viewing direction is along arrow A in FIG. 3)
Figure 2:
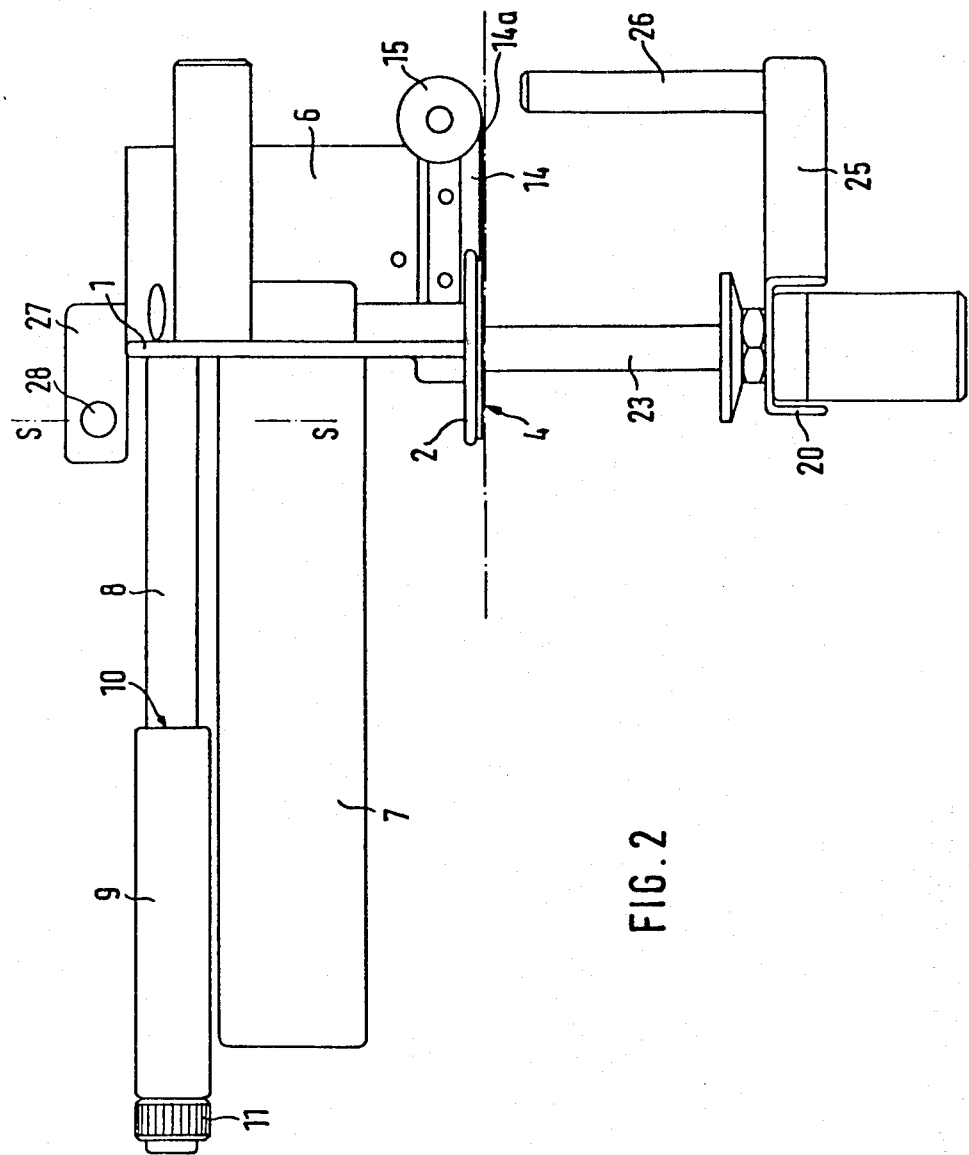
FIG. 2 is a side elevational view of the machine shown in FIG. 1 (the viewing direction is along arrow B in FIG. 3)
Figure 3:
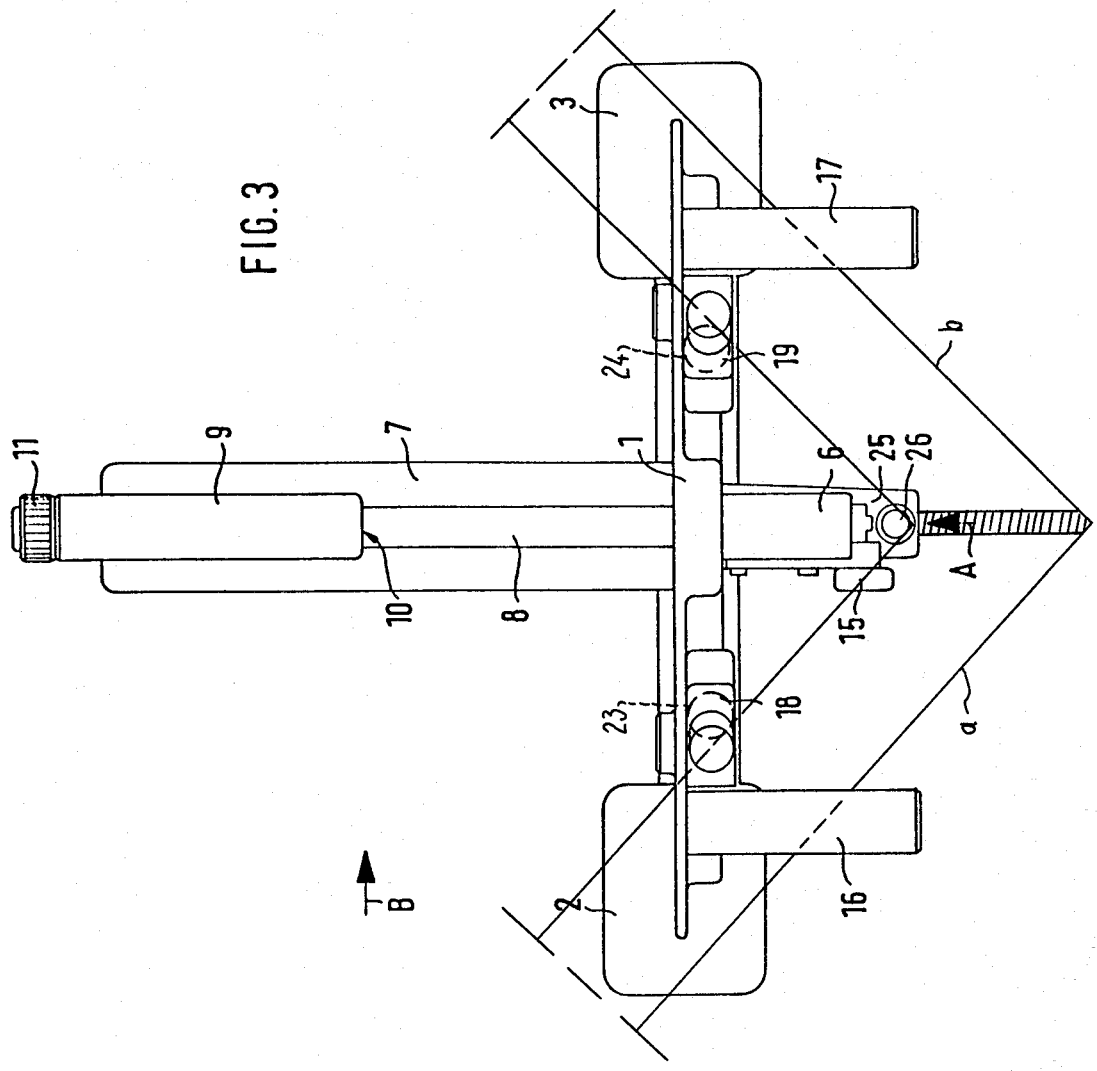
FIG. 3 is a top plan view of the machine of FIGS. 1 and 2.

In FIGS. 1–3, the reference numeral 1 indicates the upper crosspiece having the flanges 2, 3, to which the support faces 4, 5 are attached, being fitted precisely in place using casting resin. The tool carrier 6 having the pneumatic transport device 7 is secured at right angles to the plane of the crosspiece 1, being guided in an appropriate bore in the crosspiece 1 with the guidance rod 8. The free end of the guidance rod 8 is provided with a thread, not shown, on which the threaded sleeve 9 is adjustably supported, its free end face acting as the stop 10 for limiting the stroke. The stroke which has been established is fixed with the lock nut 11. It is thus possible, with these few mechanical parts, to effect a continuous adjustment of the stroke without using end switches. In the groove 6a cut into the underside of the tool carrier 6, the tool holder 12 is supported yieldingly by means of springs 13 and guided in such a way that it can be pivoted upward. The chiseling or cutting die 14 is secured to the underside of the tool holder, and the guide roller 15 is rotatably supported on one side. With the guide roller 15, the cutter 14a of the cutting die 14 is made to follow along when there are slight deviations in height of the surface being trimmed. Also attached to the upper crosspiece 1 are the handles 16, 17 and directly beside them the pressure switches 18, 19, which are pushbutton-actuated. With these pressure switches 18, 19, thumb pressure suffices to engage and disengage both the pneumatic transport device 7 and the holder cylinders 21, 22 attached to the lower crosspiece 20.

The workpieces to be machined with the apparatus according to the invention—such as plastic windows or facade frames—always have some three dimensional extension. The side parts of such frames generally have a rectangular cross section, such as shown at a and b in FIG 1. The height h of such profiled members which are usually mass produced in great quantity, differ only within narrow limits and are in every instance compensated for by the holder cylinders 21 and 22.

The rods 23 and 24 connect the upper crosspiece 1 with the lower crosspiece 20. Together with the upstanding shaft element 26 secured to the cantilever 25, they simultaneously form the arresting bracket for the appliance, with the shaft element 26 fixing the position of the apex. Since the latter is located ahead of the cutter of the cutting die 14, (See FIG. 2) it is at the same time protected from being damaged while in the position of rest. Because the frame to be trimmed is arrested against its inner edges or surfaces, even the V-shaped seams of arch abutment or transom joints can be worked on in the same manner as other corner joints. It is solely necessary that one arm of this V be only half as long as the diagonal in the corner joint. By adjusting the stop 10, the shorter stroke is easily established.

As may be seen particularly in FIG. 2, a support rib 27 having the support eyelet 28 is attached to the upper edge of the upper crosspiece 1, in the vertical central plane transverse to the plane of the crosspiece. The center point of the eyelet 28 is located precisely in the axis of gravity of the machine and this is indicated by the line S—S. This arrangement is extremely favorable, because this eyelet can be connected with the runner of an overhead conveyor track, not shown. No significant exertion of force is thus required to move the machine from one welding point to another.

The machine according to the invention is so foolproof that one skilled in the art who is supposed to use it to remove the welding burr from a joined corner of a workpiece can proceed in no other way than to displace the machine from the inside over the frame corner, counter to the direction of the arrow A, as shown in FIG. 2, until the machine strikes against the stop angle formed by the rods 23, 24 and the bolt 26. After the holder cylinders 21, 22 have been brought into play the frame corner is fixed precisely. After the pneumatic feed device 7 is turned on, the welding burr is rapidly cut off in a single cut.

Figure 4:
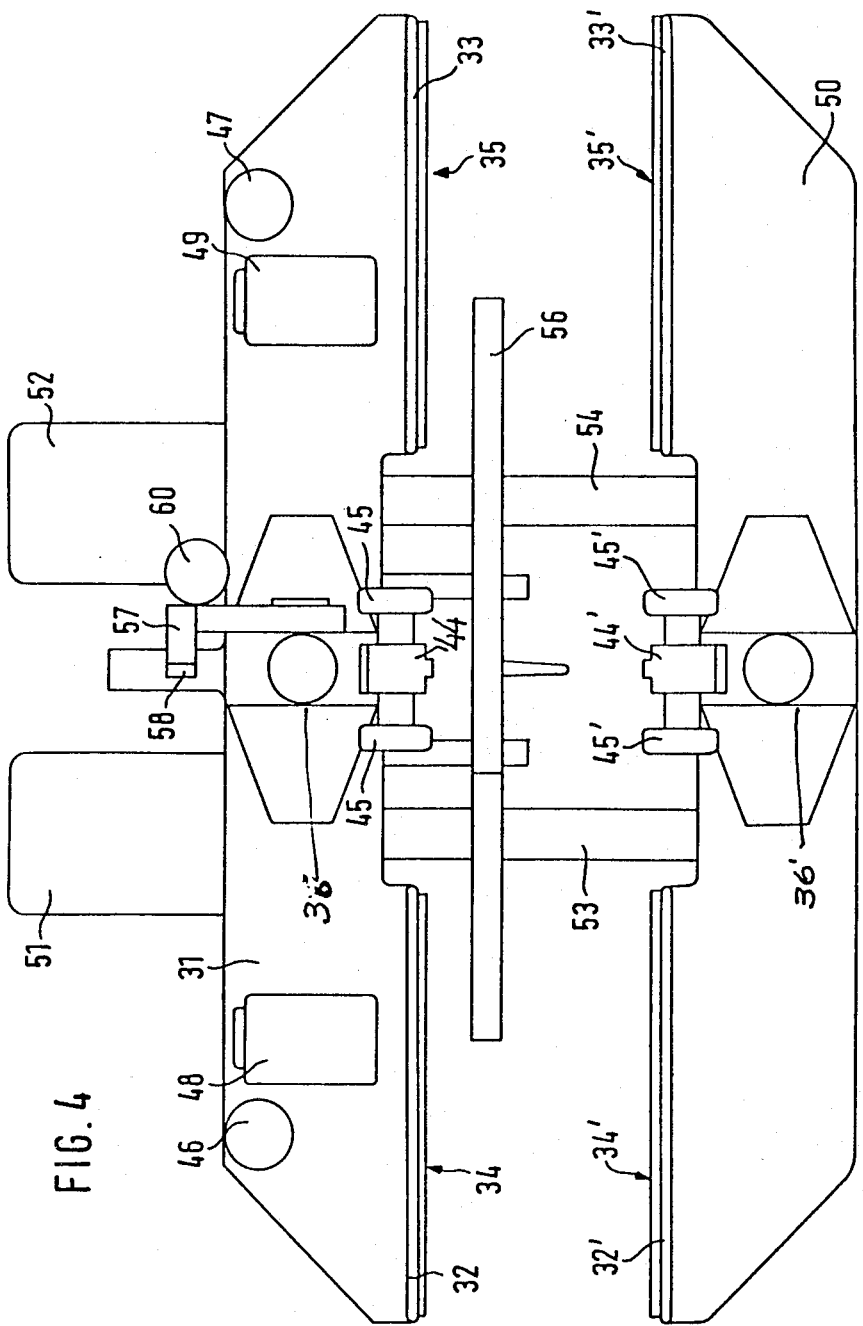
FIG. 4 is a front elevational view showing a chiseling and trimming machine having two tool carriers (the viewing direction is along arrow C of FIG. 6)
Figure 5:
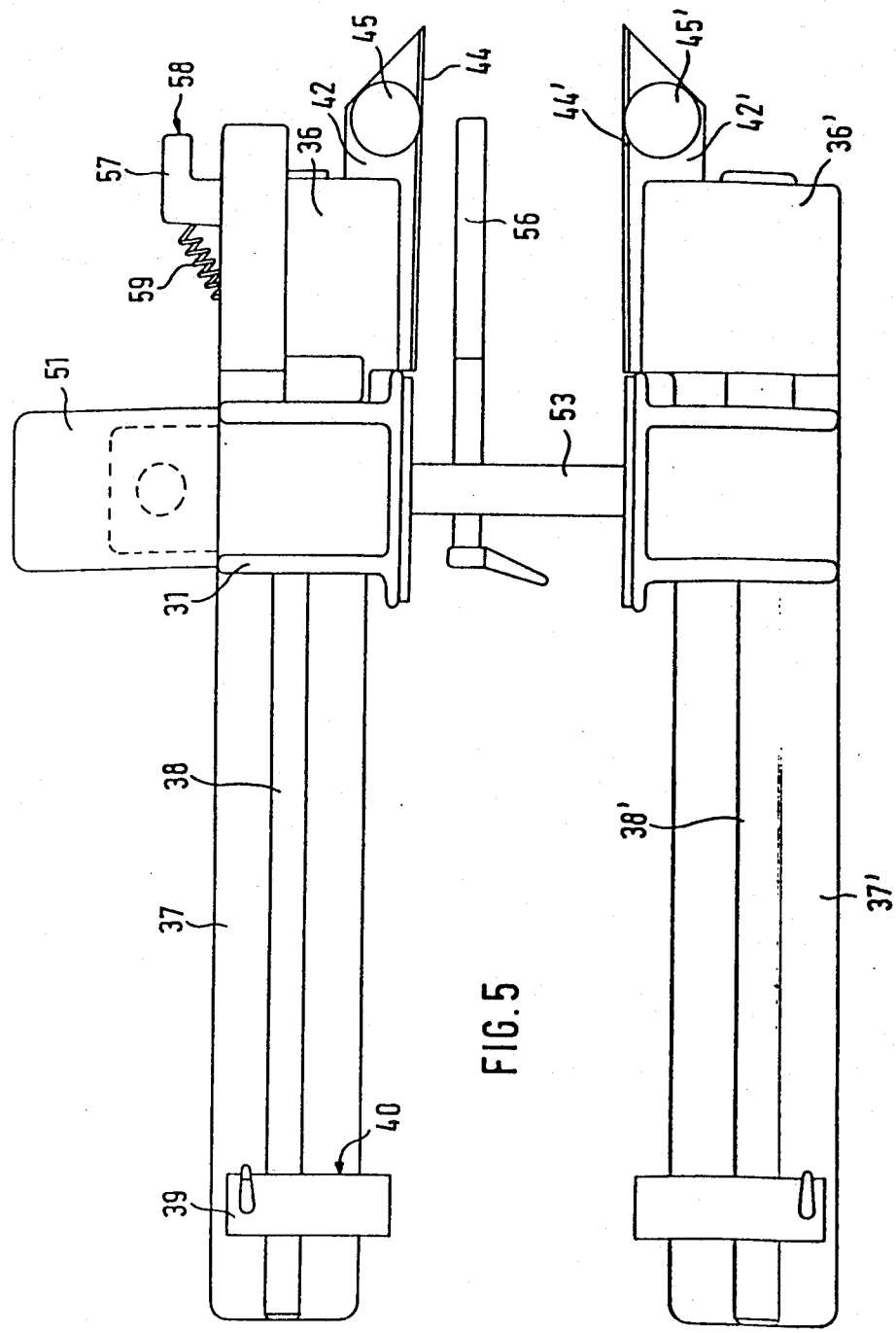
FIG. 5 is a side elevational view of the machine shown in FIG. 4 (the viewing direction is along arrow D in FIG. 6)

In FIGS. 4-6, reference numeral 31 indicates the upper crosspiece having the flanges 32, 33 and the support faces 34, 35, the tool carrier 36 having the pneumatic transport device 37, 37' and the guidance rods 38, 38'. With the exception of the guidance rods, these elements are disposed in a manner analagous to parts 1-7 in the embodiment shown in FIGS. 1-3. Differing from the first embodiment, however, the stop 40 for stroke limitation is here embodied by the ring clamp 39.

Acting as the stop for the frame to be trimmed is the holder means 56 made of sheet metal or shaped rods, which is disposed in turn underneath the tool carrier 36, so that it comes to rest against the inner surfaces of the frame to be trimmed.

Furthermore, the tool carrier 36 in this machine is supported in such a manner that it is pivotable by a few degrees (ca. 5° to 6°) of angle about its horizontal guide shaft, and the tool holder is provided at either side with a guide roller 45, 45' having convex rolling surfaces. As a result, it is possible quite satisfactorily to trim joints of shaped pieces with slightly differing heights, since the cutter of the chiseling or cutting dies 44 is obliquely adjusted in accordance with the difference in height.

In this machine, the lower crosspiece 50' is provided with a tool carrier 36', a transport device 37', a tool holder 42' and a chiseling or cutting die 44' which are embodied identically to those associated with the upper crosspiece 31. However, the holder cylinders 51 and 52 are attached to the upper crosspiece 31, and their piston rods 53, 54 are connected to the lower crosspiece 50. When the holder cylinders 51, 52 are engaged by means of the compressed-air switch 48, the entire lower crosspiece 50 is accordingly raised, coming to a stop against the workpiece which is to be trimmed. At the same time, both chiseling or cutting dies 44, 44' are moved into their working planes. With this machine, both seams of one joint are thus trimmed simultaneously. In order to minimize the cost of materials, the weight, and the cost of manufacture, both transport devices 37, 37' may be actuated by a common transport cylinder, not shown.

Particularly in the case of the structural framework or half-timbering of outside walls, it not infrequently happens that there are corner joints with angles deviating from 90°. However, since a specialized arresting bracket cannot be furnished for every angle, the machine according to FIGS. 4-6 has a small, pivotably supported bell crank 57, which is provided on its free end with an aligning cutter 58 for the purposes of aligning the frame in terms of the welding seams. The spring 59 holds the bell crank 57 in its terminal positions, and the ball head 60 serves to actuate the crank. In order to trim a corner joint with an angle deviating from 90°, the frame is first driven upward and held only lightly in place, so that it can still be adjusted. The bell crank 57 is now placed around it, and the frame is displaced or shifted in such a manner that the aligning cutter 58 is located precisely at the center of the welding seam. In the case of shaped plastic elements, the welding seams are known to form two bulges, which in cross section take the shape of a rear sight on a gun. Once the aligning cutter is located in the notch of this "gunsight", then the frame to be trimmed is fixed immovably in place.

For smoothing welding seams in material having greater strength, the transport device is appropriately equipped with a striking mechanism, such as is known in compressed-air hammers. This device is appropriately disposed between the transport cylinder and the tool carrier 6 or 36 or 36'.

This machine, which is by its nature heavier than the machine according to FIGS. 1-3, naturally also has a suspension apparatus analogous to that machine.

The foregoing relates to preferred exemplary embodiments of the invention, it being understood that other embodiments and variants thereof are possible within the spirit and scope of the invention, the latter being defined by the appended claims.

I claim:

1. A chiseling or trimming machine, intended in particular for deburring welded seams of polygonal frames comprising shaped plastic elements, said machine having a support surface on which the frame to be trimmed is placed against an arresting bracket and held immovably by means of holder cylinders, said machine further including a tool carrier displaceable in the working plane by means of a transport device, said tool carrier being arranged to yield upwardly, characterized in that said machine includes upper and lower parallel disposed crosspieces, said upper crosspiece supporting said tool carrier and a transport device arranged to extend perpendicularly relative to said crosspieces, said lower crosspiece supporting said arresting bracket by a cantilever means, at least one operator control handle on one of said crosspieces, said upper crosspiece further including terminal portions provided with support surfaces and said arresting bracket further including parallel rod means cooperating with said upper and lower crosspiece.

2. A chiseling or trimming machine as defined by claim 1, characterized in that said arresting bracket further includes oppositely disposed surfaces of a holder means constructed of sheet metal.

3. A chiseling or trimming machine as defined by claim 1, characterized in that said upper crosspiece is provided with switch means in proximity to said at least one operator control handle.

4. A chiseling or trimming machine as defined by claim 1, characterized in that said transport device further includes an arbitrarily adjustable stroke-limiting means.

5. A chiseling or trimming machine as defined by claim 1, characterized in that said upper crosspiece further includes a support rib which projects thereabove, said support rib having a support eyelet for suspension of said machine.

6. A chiseling or trimming machine as defined by claim 1, characterized in that said tool carrier is supported pivotably on a horizontal shaft associated with said upper crosspiece, and said tool carrier further includes guide roller means.

7. A chiseling or trimming machine as defined by claim 1, characterized in that said lower crosspiece is likewise provided with a tool carrier, which is disposed in mirror-image fashion relative to said first named tool carrier, and further that said upper crosspiece is provided with power operated cylinder means and said cylinder means are connected with said lower crosspiece by rod means.

8. A chiseling or trimming machine as defined by claim 7, characterized in that said transport device includes upper and lower portions which are operated by a common transport cylinder.

9. A chiseling or trimming machine as defined by claim 1, characterized in that in proximity to said upper crosspiece an angular element is pivotably attached to said tool carrier for aligning said cutting die with said seam, said angular element further including.

10. A chiseling or trimming machine as defined by claim 1, characterized in that said transport device is provided with a striking mechanism.

* * * * *